US006516998B2

(12) United States Patent
Calder et al.

(10) Patent No.: US 6,516,998 B2
(45) Date of Patent: Feb. 11, 2003

(54) SELF-SERVICE TERMINAL

(75) Inventors: Andrew Calder, Dundee (GB); Gary A. Ross, Fife (GB); John A. Peebles, Dundee (GB); Simon J. Forrest, Dundee (GB); Ian McIntyre, Dundee (GB); Christopher W. Wylie, Dundee (GB); David Sommerville, Edinburgh (GB); Timothy P. Johnson, Enumclaw, WA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/912,060

(22) Filed: Jul. 24, 2001

(65) Prior Publication Data

US 2002/0023954 A1 Feb. 28, 2002

(30) Foreign Application Priority Data

Aug. 2, 2000 (GB) ........................................... 0018801

(51) Int. Cl.[7] ................................................ G06F 7/08

(52) U.S. Cl. ...................... 235/381; 235/379; 235/384; 235/383; 235/385

(58) Field of Search ................................ 235/381, 375, 235/379, 383, 384, 385

(56) References Cited

U.S. PATENT DOCUMENTS

| | | | | |
|---|---|---|---|---|
| 4,017,004 A | | 4/1977 | Onoe et al. | |
| 4,262,817 A | | 4/1981 | Fish | |
| 4,587,408 A | * | 5/1986 | Watanabe | 209/534 |
| 4,756,449 A | | 7/1988 | Miura | |
| 4,884,698 A | | 12/1989 | Tutamune et al. | |
| 5,158,274 A | * | 10/1992 | Hamada et al. | 235/379 |
| 5,499,707 A | * | 3/1996 | Steury | 186/36 |
| 5,673,333 A | * | 9/1997 | Johnston | 235/379 |
| 5,684,285 A | * | 11/1997 | Faes et al. | 235/449 |
| 6,036,089 A | * | 3/2000 | Oguchi et al. | 235/379 |
| 6,073,837 A | * | 6/2000 | Milne | 221/195 |
| 6,131,809 A | * | 10/2000 | Drescher et al. | 235/375 |
| 6,241,150 B1 | * | 6/2001 | Patterson | 235/379 |
| 6,276,603 B1 | * | 8/2001 | Patterson | 235/379 |
| 6,315,194 B1 | * | 11/2001 | Graef et al. | 235/379 |

FOREIGN PATENT DOCUMENTS

| | | | | |
|---|---|---|---|---|
| GB | 1535706 | | 12/1978 | |
| JP | 06231341 A | * | 8/1994 | G07D/9/00 |

* cited by examiner

*Primary Examiner*—Karl D. Frech
*Assistant Examiner*—Daniel Walsh
(74) *Attorney, Agent, or Firm*—Peter H. Priest

(57) ABSTRACT

A self-service terminal (SST) (10) is provided which includes a plurality of media dispense and deposit modules (16), a media port (14), and a media transport (22) movable between the modules (16) and the port (14), the transport (22) including a media entrance and a media exit. The transport (22) may be movable vertically, horizontally, or both. Embodiments of the invention include SSTs with a number of separate media module assemblies and a number of movable transports, and SSTs with two communicating transports which may pass media between them.

6 Claims, 2 Drawing Sheets

SELF-SERVICE TERMINAL

BACKGROUND OF THE INVENTION

The present invention relates to a self-service terminal (SST), such as an automated teller machine (ATM), and to a media transport mechanism for use therein.

Self-service terminals (SSTs) may be used for dispensing a wide range of media: banknotes of several denominations, printed receipts, tickets, and so forth. They may also or instead have facilities for entering media into the SST: banknotes or cheques, tickets, vouchers and the like. SSTs may also have facilities for receiving ATM cards, credit cards, smart cards and the like; for convenience, all these items will hereinafter be referred to as "media". Conventional SSTs are constructed with a module dedicated to each media function: for example, one set of modules may dispense banknotes of different denominations, one module may accept a user's magnetic strip cards, a further module prints and dispenses receipts and paper slips while a fourth module may accept deposited banknotes and cheques. Each of these modules, or groups of modules, is also provided with a media port on the fascia of the SST to allow entry or exit of the appropriate media to the module. However, space on an SST fascia is limited, and a plethora of ports will not only look unsightly, but may also be confusing to a user. Further, the addition of another module to an SST may necessitate an extensive redesign of both the SST fascia and the internal module arrangement.

SUMMARY OF THE INVENTION

It is therefore among the objects of embodiments of the present invention to obviate or alleviate these and other disadvantages of existing SSTs, and also to enable new modules to be added to an SST relatively simply, without requiring extensive redesign of the SST, and in particular the SST fascia. This is achieved in certain embodiments of the invention in part by the provision of a transport mechanism which is itself movable between modules and ports.

According to a first aspect of the present invention, there is provided a self-service terminal (SST) comprising a plurality of media modules, a media port, and a movable media transport, the transport comprising a housing having a media entrance and a media exit for ingress and egress of media, respectively, and the transport being movable between the media modules and the media port.

This aspect of the invention therefore enables a number of modules to make use of a single common media port, and to provide fewer ports than modules. The invention also enables a media module to be located a distance away from its associated port. "Media" as used herein is intended to include, for example, banknotes, paper items, cheques, tickets, and plastic cards.

Preferably the transport is vertically movable. The transport may instead or in addition be horizontally movable. In preferred embodiments of the invention, the transport is both horizontally and vertically movable, and front faces of the media modules are arranged to lie in the same depth plane, so that no depthwise movement of the transport is necessary.

Preferably the transport further comprises media movement means for moving media into and out of the transport. The media movement means may comprise, for example, rollers, belts, a tray, or the like. There may be provided separate media movement means for moving media respectively in and out of the transport. The movement means may be capable of moving media items either singly, or bunched, or both.

The housing may be completely enclosed, except the entrance and exit; or may merely be a partial enclosure, serving to define a space for retaining media.

Preferably the media entrance and the media exit are on opposed sides of the transport. This enables media to flow through the transport along a single movement path, and conforms to the conventional arrangement of SSTs, with the media modules arranged behind the media port from a user's point of view. Alternatively, the media entrance and media exit may be on the same face of the transport, in which case the media entrance may also serve as the media exit.

In certain embodiments of the invention, the media modules may be media dispense modules, and the transport media entrance receives media from the modules, while the media exit delivers media to the media port. Other embodiments of the invention may provide the media modules as media deposit modules, with the transport media entrance receiving media from the media port, and the media exit delivering media to the modules.

Preferred embodiments of the invention include both media dispense and media deposit modules. Such embodiments may comprise two media transports, one serving the dispense module or modules, and one serving the deposit module or modules. There may also be provided two media ports, one for each transport. In certain embodiments of the invention, the SST may comprise two or more modular assemblies, each of which comprises media modules of one type (dispense or deposit), a media port, and a media transport. These assemblies may be easily and swiftly assembled in any desired combination to provide additional functionalities to an SST.

Alternatively, a single transport may serve both media dispense and media deposit modules. The roles of the transport media entrance and the media exit may switch, depending on whether the transport is currently serving a deposit or a dispense module. Alternatively, the transport may comprise two media entrances and two media exits, having one of each type on either side of the transport.

Some SSTs, particularly those dealing with valuable media such as banknotes, include a reinforced security safe in which media to be dispensed is stored. The present invention may include such SSTs, which further comprise a media transport disposed within the safe, and a media transport disposed outwith the safe, the transports being in communication via an opening in the safe such that media may pass from one transport to the other. The transport outwith the safe is preferably also movable to access media modules outwith the safe.

Preferably the transport comprises sensors. These may be sensors for detecting properties of media within the transport. For example, note thickness sensors may be used to determine whether notes are present as a single note or as multiple notes. Other media sensors which may be used include sensors for detecting dimensions of media; or magnetic or optical sensors for determining magnetic or optical properties of media. The transport may also include sensors for determining the alignment of the transport with respect to media modules or the media port to ensure that the transport media entrance or exit is aligned correctly with the media modules or media port; for example, optical, magnetic or electronic sensors may be used. Alternatively, or in addition, similar sensors may be provided on the media modules or media port.

The transport may further comprise printing means, for generating printed marks on media; for example, receipts or acknowledgement slips dispensed by the SST may be printed within the transport.

Preferably the transport comprises media collator means, for collating bundles of media within the transport. Typically media to be dispensed is removed from the media modules singly, but is presented to the user as a bundle of media. For example, the media collator means may comprise a bin in which single media are placed, to assemble a bundle.

According to a second aspect of the present invention, there is provided a method of dispensing media from a self-service terminal (SST) including a plurality of media modules, the method comprising the steps of:

moving a media transport to a first media module;

dispensing media from the first module into a housing of the media transport;

moving the transport to a media dispense slot; and presenting the media from the transport through the dispense slot.

Preferably the method further includes the steps of:

moving the transport to a subsequent module;

dispensing media from the module into a housing of the transport;

repeating the previous two steps as necessary until the transport has gathered all media to be dispensed.

These steps may be executed either before or after moving the media transport to a media dispense slot.

According to a further aspect of the present invention, there is provided a method of depositing media in a self-service terminal (SST) including a media module, the method comprising the steps of:

locating a media transport comprising a housing adjacent a media port;

accepting media into the housing of the transport from the port;

moving the media transport to a media module; and transferring media from the transport to the module.

According to a still further aspect of the invention, there is provided a self-service terminal (SST) comprising a plurality of modular assemblies, each assembly comprising at least one media module, a media port, and a media transport for transporting media between the port and the module.

Conveniently a plurality of media modules are provided in some or all of the modular assemblies, and the transport may transport media between the modules and the media port of an assembly.

The media transport of an assembly may be movable between the modules and the port, in a similar manner to those aspects of the invention described above. In preferred embodiments of the invention, however, the media transport comprises an elongate media path along which media may move. Preferably the media is driven along the media path by a media conveyor, which may comprise a gear train, or a series of belts or the like.

Where a plurality of modules are provided in an assembly, preferably the transport of an assembly may selectively pass media between the media port and a selected one of the modules.

Preferably at least one modular assembly is for accepting media, and at least one other modular assembly is for dispensing media. In this way, each media transport need only transport media in one direction. Preferably the media accepting modular assembly further comprises means for identifying entered media, and means for selectively transporting identified media to a selected module. The means for identifying media may for example comprise an optical scanner. Thus, for example, entered banknotes may be identified as a particular denomination, and transported to a module designated for receiving that particular denomination of banknote.

According to a yet further aspect of the present invention, there is provided a self-service terminal (SST) comprising a modular assembly for accepting media, the assembly comprising a plurality of media modules, a media port and an elongate media path along which media may move, for selectively transporting media from the media port to a selected media module.

BRIEF DESCRIPTION OF THE DRAWINGS

These and other aspects of the present invention will now be described by way of example only and with reference to the accompanying drawings, in which.

DETAILED DESCRIPTION

Figure 1:
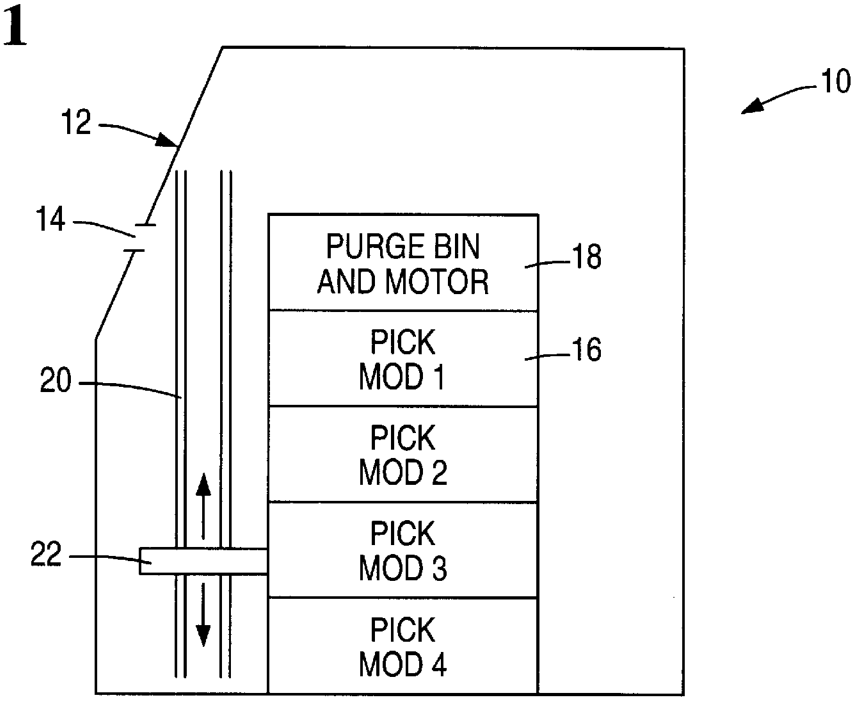
FIG. 1 shows a sketch of a self-service terminal (SST) in accordance with a first embodiment of the present invention.

Referring first of all to FIG. 1, this shows a self-service terminal (SST) in accordance with a first embodiment of the present invention. The SST 10 includes a fascia 12 which is accessible by a user, in which is set a media port 14 through which banknotes are dispensed to the user. Inside the SST 10 are located four media dispense modules 16, each of which contains a different denomination of banknotes, and a media purge bin 18, for receiving banknotes which cannot be dispensed (for example, if multiple notes are picked from a module in error). Mounted on a pair of vertical tracks 20 and driven by motors (not shown) between the modules 16 and the SST fascia 12 is a movable media transport 22.

When a user wishes to obtain money from the SST 10, the SST 10 first determines which combination of notes to dispense, to make up the desired amount. The media transport 22 is then moved to lie adjacent the lowest of the modules 16, and the appropriate number of banknotes of the particular denomination held by the module 16 are removed from the module 16 and passed into the transport 22. The transport 22 is then moved upward to the next module 16, and the process repeated. Once all necessary modules 16 have been visited, the transport is moved into alignment with the media port 14 and the purge bin 18. If all is well with the transaction, the gathered media is presented through the media port 14 to the user. If the transaction is cancelled, or if the user fails to take their presented banknotes, the media is moved in the reverse direction into the purge bin 18, where it is stored until a human operator can confirm the contents of the bin.

Figure 2:
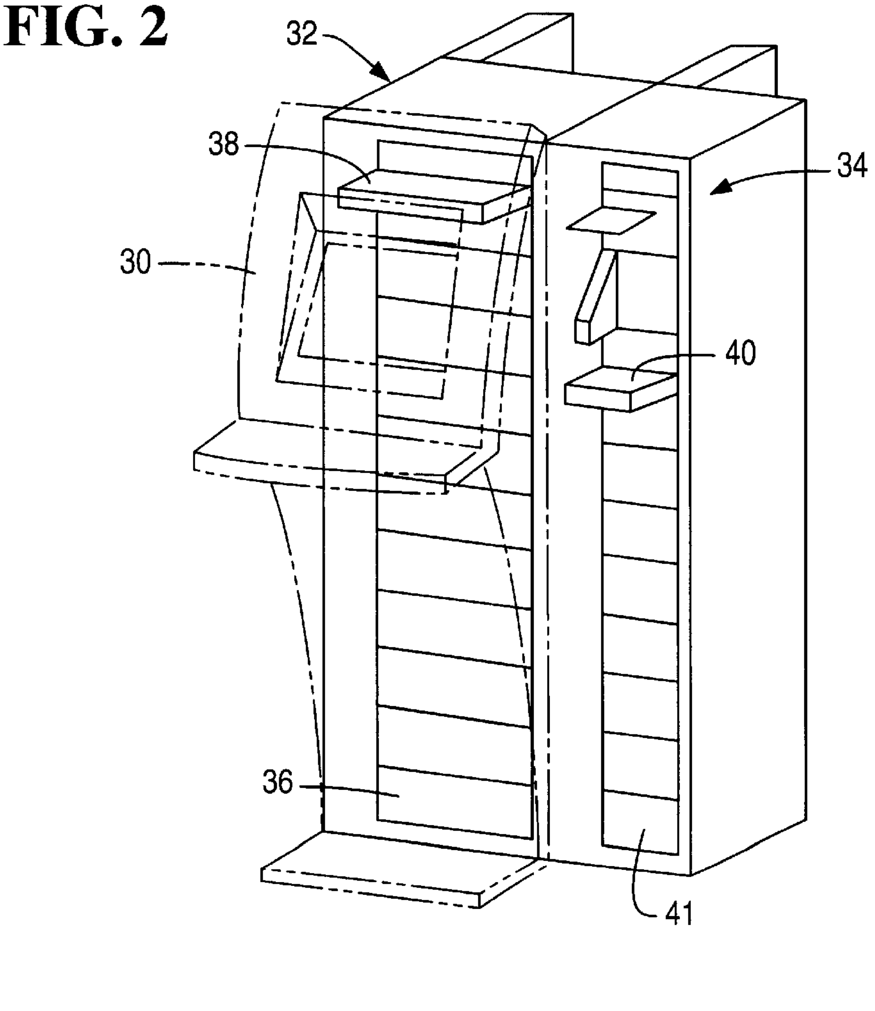
FIG. 2 shows an SST in accordance with a second embodiment of the present invention.

A modification of this first embodiment is shown in FIG. 2. This Figure illustrates an SST 30 including two separate modular assemblies or stacks 32, 34 of modules 36. Each stack 32, 34 includes a vertically movable transport (not shown) as described above. The first stack 32 is essentially identical to the SST 10 described in relation to FIG. 1, comprising a number of dispense modules 36 and a media dispense port 38. The other stack 34 however consists of a media deposit port 40 and a number of media deposit modules 41. If a user wishes to deposit banknotes into the SST 30, they may place the notes, either singly or in a bundle, into the deposit slot 40. The media are fed into a vertically-movable transport, which includes currency identification and validation sensors to detect non-genuine banknotes. The transport is then moved to each deposit module 41 in turn, where the media may be transferred from the transport to the appropriate module.

Figure 3:
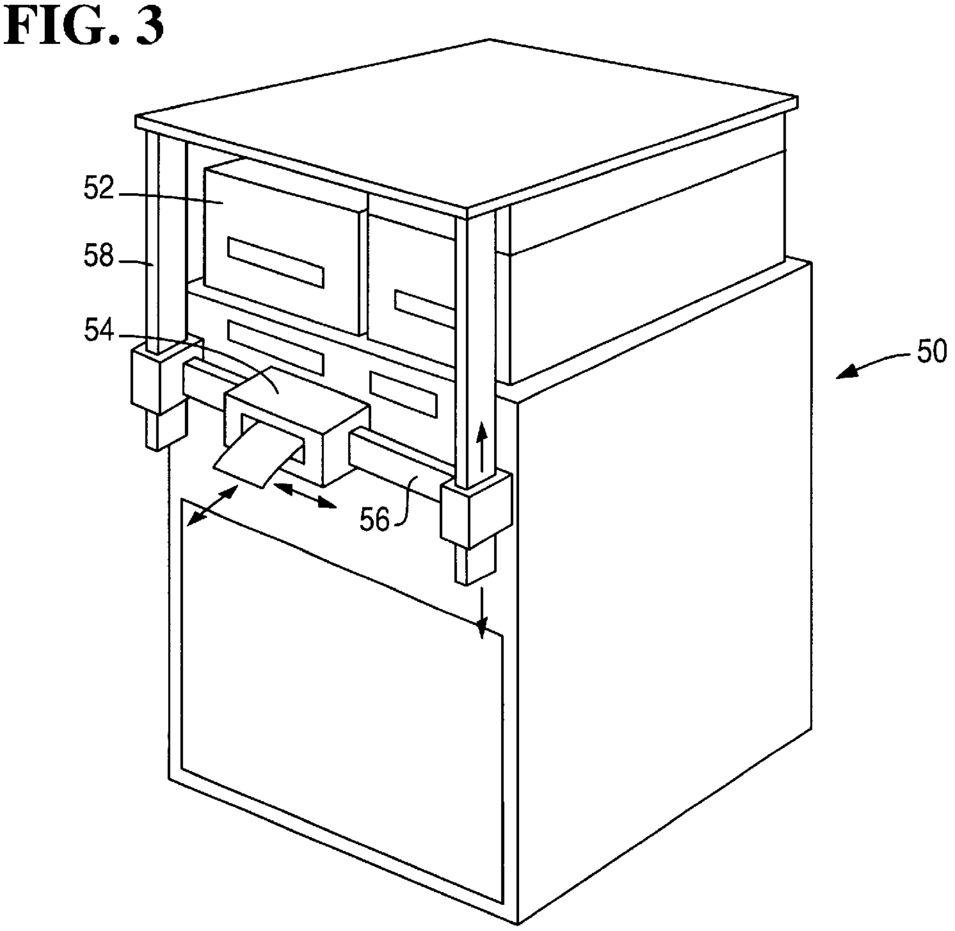
FIG. 3 shows a portion of an SST in accordance with a third embodiment of the present invention.

A further alternative embodiment of the invention is shown in FIG. 3. This shows a portion of an SST 50 with the fascia removed. The SST 50 includes a number of media modules 52 arranged within the SST, and a media transport 54 movably mounted on both horizontal 56 and vertical rails 58. The operation of the SST 50 is similar to those described above, with the additional features that the transport 54 is able to both accept and dispense media, and can be moved horizontally as well as vertically. Thus, a single transport 54 is sufficient to interface with both media dispense modules and media deposit modules, as well as modules which accept and return media (for example, magnetic strip card readers).

Figure 4:
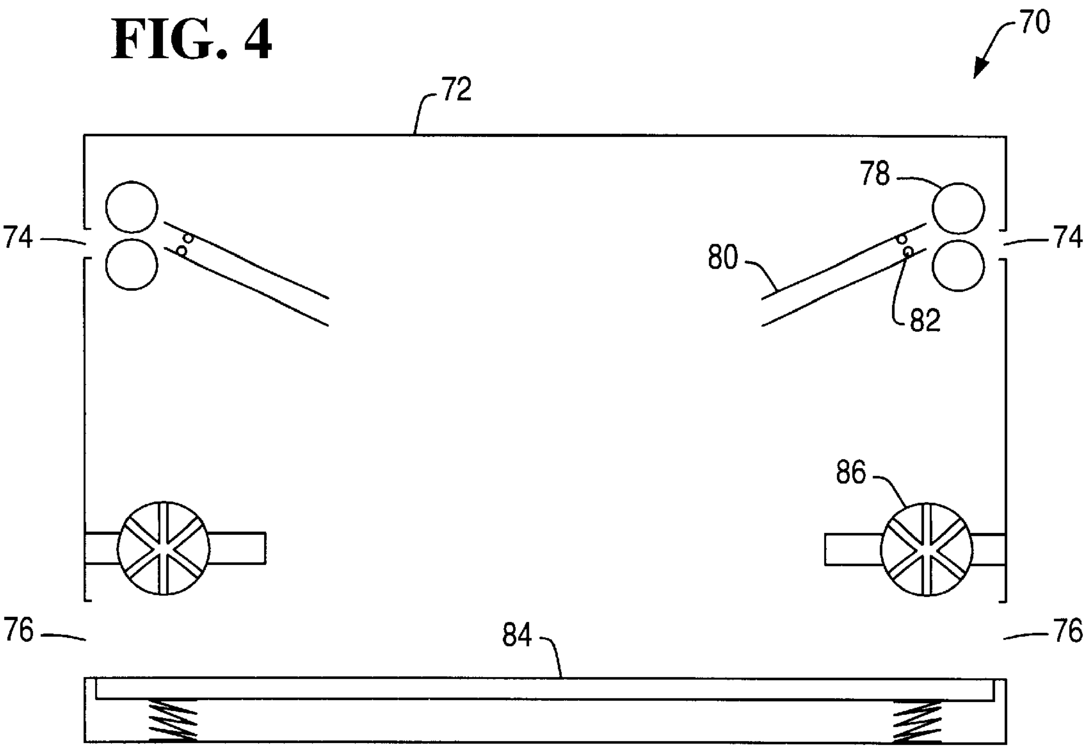
FIG. 4 shows a sketch of a media transport as may be used with the SSTs of FIGS. 1 to 3.

FIG. 4 shows a sketch of a media transport suitable for use with the SSTs of FIGS. 1 to 3. The transport 70 comprises a container 72 with two media entrances 74, and two media exits 76. When media is to enter the transport 70, the transport is moved to align one of the entrances 74 with a media present means of, for example, a media dispense module. Media items are presented through the entrance 74 one at a time, with each item being driven by rotating drive wheels 78 along a guide chute 80. Passing along the chute 80, the media passes through a note thickness sensor 82, which determines the thickness of each note, and hence whether a single note has correctly passed through the sensor, or if two or more notes have inadvertently been picked. If multiple notes are detected, the deposit is void, and the contents of the transport 70 can be dumped in the SST purge bin.

Picked media falls from the chute 80 to the lower portion of the container 72, where it lies on sprung platform 84. As further media is taken into the transport 70, a bundle of media is assembled. Rubber flick wheels 86 are moved into contact with the assembled media bundle, and media is picked individually from the bundle and passed through media exit 76. Alternatively, the flick wheels 86 may be replaced by pairs of rollers, to present the whole bundle at once through the exit 76.

Provision of entrances 74 and exits 76 on both faces of the transport 70 allows the transport to be used to pass media in either direction.

A modified transport may be provided with only the upper entrances 76, leaving only a single aperture on either side of the transport 70, which apertures may act as entrances or exits as appropriate.

In an alternative embodiment of the invention, the SST illustrated in FIG. 2 may be modified by replacing the movable media transport as described with an elongate media path along which media may be moved by means of a gear train. Gear wheels may be provided on each module 36, 41 which transfer media between the module and a common transport path connected to the respective media port 38, 40. The wheels of each module 36, 41 may also interact with wheels of other modules in the same stack to form the transport path, and so that modules may easily be added or removed from the stack without the need to re-configure the SST. Part of the transport path may also be selectively actuated to direct media to or from a selected module; for example, in sorting entered media into separate modules for each denomination.

It can be seen that the present invention therefore provides an SST with a media transport system which is easily adaptable and re-configurable to take account of redesigns, and which may readily be extended with additional modules and functionalities. Further, certain embodiments of the invention remove the necessity for long media transport paths, keeping movement of the media alone to a minimum.

What is claimed is:

1. A media transport for dispensing and depositing media between a media access port and a module comprising:

a housing having a base, a vertical wall, a media entrance slot defined by a separation in the vertical wall;

a plurality of drive wheels aligned with the media entrance slot to draw media into the transport then on to the base;

a sensor to detect media type upon entrance of media through the media entrance slot; and an exiting means for guiding the media from the base to either the module or the media access port.

2. A self-service terminal comprising:

a plurality of media modules, the plurality of media modules includes a media dispense module and a media deposit module;

a media port;

a first movable media transport movable between the media modules and the media port, the first movable media transport including a housing having a media entrance and a media exit for ingress and egress of media, respectively, the first movable media transport further including a sensor to detect media type, the first movable media transport deposits media from the media port to any of the plurality of media modules and dispenses media from any of the plurality of media modules to the media port; and a second movable media transport, the first movable media transport is associated with serving the media dispense module and dispenses media from the media dispense module to the media port, the second movable media transport is associated with serving the media deposit module and deposits media received from the media port to the media deposit module.

3. A self-service terminal comprising:

a plurality of media modules, the plurality of media modules includes at least one media dispense module and at least one media deposit module;

a media port;

a first movable media transport movable between the at least one media dispense module and the media port;

a second movable media transport movable between the at least one media deposit module and the media port, both movable media transports including a housing having a media entrance and a media exit for ingress and egress of media, respectively; and a security safe within which a third media transport is disposed, and outside which the second media transport is disposed, the security safe including means defining an opening through which media can pass from the second media transport to the third media transport.

4. A self-service terminal comprising:

a plurality of media modules;

a media port;

a first movable media transport movable between the media modules and the media port, the first movable media transport including a housing having a media entrance and a media exit for ingress and egress of media, respectively, the first movable media transport further including a sensor to detect media type, the first movable media transport deposits media from the media port to any of the plurality of media modules and dispenses media from any of the plurality of media modules to the media port;

a spring platform;

a drive wheel for drawing media into the media transport and onto the spring platform; and an exiting means for guiding the media from the spring platform out of the media transport.

5. The self-service terminal of claim 4, wherein the exiting means further comprises a flick wheel operable to pick the media from the spring platform.

6. A self-service terminal comprising:

a plurality of media modules;

a media port;

a movable media transport movable between the media modules and the media port, the media transport including a housing having a media entrance and a media exit for ingress and egress of media, respectively;

the plurality of media modules includes at least one media dispense module and at least one media deposit module;

another media transport such that one media transport is associated with serving the at least one media dispense module and the other media transport is associated with serving the at least one media deposit module; and a security safe within which one media transport is disposed, and outside which the other media transport is disposed, the security safe including means defining an opening through which media can pass from one media transport to the other media transport.

* * * * *